United States Patent
Iga

(10) Patent No.: US 7,936,375 B2
(45) Date of Patent: May 3, 2011

(54) IMAGE PROCESSOR, IMAGING DEVICE, AND IMAGE PROCESSING SYSTEM USE WITH IMAGE MEMORY

(75) Inventor: Kiichiro Iga, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 474 days.

(21) Appl. No.: 11/362,153

(22) Filed: Feb. 27, 2006

(65) Prior Publication Data
US 2007/0046683 A1    Mar. 1, 2007

(30) Foreign Application Priority Data
Aug. 29, 2005    (JP) .................................. 2005-248271

(51) Int. Cl.
*H04N 5/228* (2006.01)
(52) U.S. Cl. ....... 348/222.1; 710/68; 713/600; 713/601; 382/162; 382/163; 382/164; 382/165; 382/166; 382/167; 382/232
(58) Field of Classification Search ................ 348/222.1; 713/600, 601; 710/68; 382/162–167, 232
See application file for complete search history.

(56) References Cited

U.S. PATENT DOCUMENTS

| | | | |
|---|---|---|---|
| 5,731,770 A * | 3/1998 | Minoda | 341/61 |
| 5,894,588 A * | 4/1999 | Kawashima et al. | 710/68 |
| 6,005,618 A | 12/1999 | Fukui et al. | |
| 7,164,442 B2 | 1/2007 | Takane | |
| 2001/0002952 A1 | 6/2001 | Sakai | |
| 2002/0004862 A1 | 1/2002 | Horikomi et al. | |
| 2002/0030751 A1 * | 3/2002 | Takane | 348/222 |
| 2005/0052542 A1 | 3/2005 | Iwai et al. | |
| 2005/0134907 A1 | 6/2005 | Obuchi et al. | |
| 2006/0007052 A1 * | 1/2006 | Nakamura et al. | 345/1.2 |

FOREIGN PATENT DOCUMENTS

| | | |
|---|---|---|
| JP | 10-108170 A | 4/1998 |
| JP | 11184889 | 7/1999 |
| JP | 2000-078513 | 3/2000 |
| JP | 2004-009540 A | 1/2004 |
| JP | 2004-286780 A | 10/2004 |
| JP | 2004-297300 A | 10/2004 |
| JP | 2005-086599 A | 3/2005 |
| JP | 2005-150985 A | 6/2005 |

* cited by examiner

*Primary Examiner* — David L Ometz
*Assistant Examiner* — Antoinette T Spinks
(74) *Attorney, Agent, or Firm* — Arent Fox LLP

(57) ABSTRACT

An image processor for lowering data transfer speed. A JPEG compression circuit performs two-dimensional compression process on data output from a YCbCr conversion circuit to generate compressed image data. A timing signal generator changes the frequency of a transfer clock signal in accordance with the compressed image data. An output circuit outputs the compressed image data in accordance with the transfer clock signal.

12 Claims, 5 Drawing Sheets

Fig.5(A)
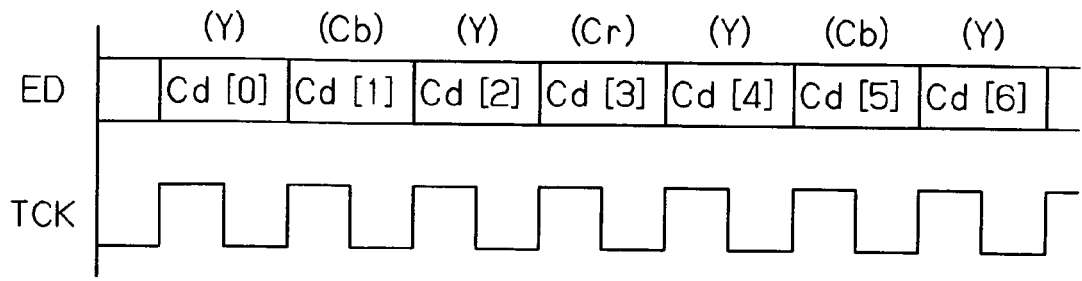
Fig.5(B)
| Cd [0] | Cd [1] | Cd [2] | Cd [3] |
|--------|--------|--------|--------|
| Cd [4] | Cd [5] | Cd [6] |        |
|        |        |        |        |
Fig.6(A)
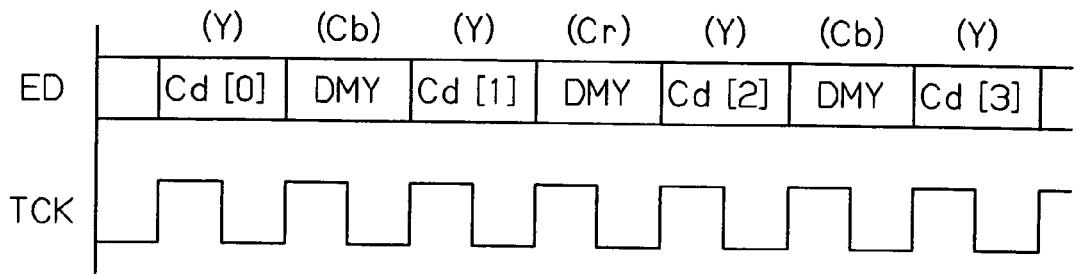
Fig.6(B)
| Cd [0] | Cd [1] | Cd [2] | Cd [3] |
|--------|--------|--------|--------|
|        |        |        |        |
|        |        |        |        |

IMAGE PROCESSOR, IMAGING DEVICE, AND IMAGE PROCESSING SYSTEM USE WITH IMAGE MEMORY

CROSS-REFERENCE TO RELATED APPLICATIONS

This application is based upon and claims the benefit of priority from prior Japanese Patent Application No. 2005-248271, filed on Aug. 29, 2005, the entire contents of which are incorporated herein by reference.

BACKGROUND OF THE INVENTION

The present invention relates to an image processor.

Recently, imaging elements having over one million pixels, such as a charge coupled device (CCD) and a CMOS image sensor (CiS), are being used in image processing systems such as digital cameras. Thus, high-speed data transfer is required for an image processor and a signal processor that processes the image data output from the imaging elements.

Generally, an image processing system includes a camera module and a base band LSI. The camera module includes an imaging unit, which includes imaging elements and generates image data for the three primary colors (RGB), and an image processing LSI, which converts the image data to image data in luminance/chrominance (YCbCr) format. The base band LSI compresses the image data output from the camera module to generate compressed image data and stores the compressed image data in the image memory.

The volume of data processed by the image processing LSI and the base band LSI, respectively, and the volume of data provided from the image processing LSI to the base band LSI increase as the number of pixels of the imaging element increases. The transfer time of data affects the time necessary until the next photograph can be taken (photographing interval).

One method for shortening the transfer time is to raise the transfer speed between the image processing LSI and the base band LSI. The frequency of a clock signal used for transferring data between the image processing LSI and the base band LSI is increased to raise the transfer speed. However, the employment of an interface enabling response to a high frequency clock signal for the image processing LSI (and base band LSI) increases the cost of the LSIs.

Japanese Laid-Open Patent Publication No. 2000-078513 describes another method for shortening the transfer time. In this method, the image data is compressed in compliance with the Joint Photographic Experts Group (JPEG) format with an encoder arranged in the image processing LSI to reduce the volume of data transferred between the image processing LSI and the base band LSI.

SUMMARY OF THE INVENTION

However, the data length of compressed image data in the JPEG format is not constant. For example, the data length differs in accordance with the volume of information (e.g., darkness of color) of each pixel in one frame. A conventional input/output circuit operates in accordance with a transfer clock signal having a frequency that is determined so as to enable the transfer the data having the maximum length. Thus, it is difficult to reduce the frequency of the transfer clock signal.

It is also required that the operation time of the image processing system be prolonged. When the operation time is prolonged, it is desired that the power consumption be reduced. However, an increase in the frequency of the transfer clock signal raises power consumption. Thus, the demand for reduction in power consumption when prolonging the operation time cannot be satisfied.

The present invention provides an image processor for lowering the transfer speed and reducing power consumption.

One aspect of the present invention is an image processor for use with an external device. The image processor includes an image processing unit for performing predetermined image processing on image data and outputting processed image data. A two-dimensional compression circuit performs a two-dimensional compression process on the processed image data and generates compressed image data. A timing signal generator changes frequency of a transfer clock signal in accordance with the compressed image data. An output circuit outputs the compressed image data to the external device in accordance with the transfer clock signal.

Another aspect of the present invention is an imaging device for use with an external device. The imaging device includes an imaging unit for outputting image data in accordance with incident light. An image processor, connected to the imaging unit, performs predetermined image processing on the image data. The image processor includes an image processing unit for performing predetermined image processing on the image data and outputting processed image data. A two-dimensional compression circuit performs a two-dimensional compression process on the processed image data and generates compressed image data. A timing signal generator, connected to the two-dimensional compression circuit, changes frequency of a transfer clock signal in accordance with the compressed image data. An output circuit, connected to the timing signal generator, outputs the compressed image data to the external device in accordance with the transfer clock signal.

A further aspect of the present invention is an image processing system for use with an external device. The imaging processing system includes an imaging unit for outputting image data in accordance with incident light. An image processor, connected to the imaging unit, performs predetermined image processing on the image data. A signal processor, connected to the image processor and an image memory, stores the image data output from the image processor in the memory. The image processor includes an image processing unit for performing predetermined image processing on the image data and outputting processed image data. A two-dimensional compression circuit performs a two-dimensional compression process on the processed image data and generates compressed image data. A timing signal generator, connected to the two-dimensional compression circuit, changes frequency of a transfer clock signal in accordance with the compressed image data. An output circuit, connected to the timing signal generator, outputs the compressed image data to the external device in accordance with the transfer clock signal.

BRIEF DESCRIPTION OF THE DRAWINGS

The invention, together with objects and advantages thereof, may best be understood by reference to the following description of the presently preferred embodiment together with the accompanying drawings in which:

FIGS. 5(A), 5(B), 6(A), and 6(B) are diagrams showing the operation of the output circuit.

DETAILED DESCRIPTION OF THE PREFERRED EMBODIMENTS

An image processing system 10 according to a preferred embodiment of the present invention will now be described.

Figure 1:
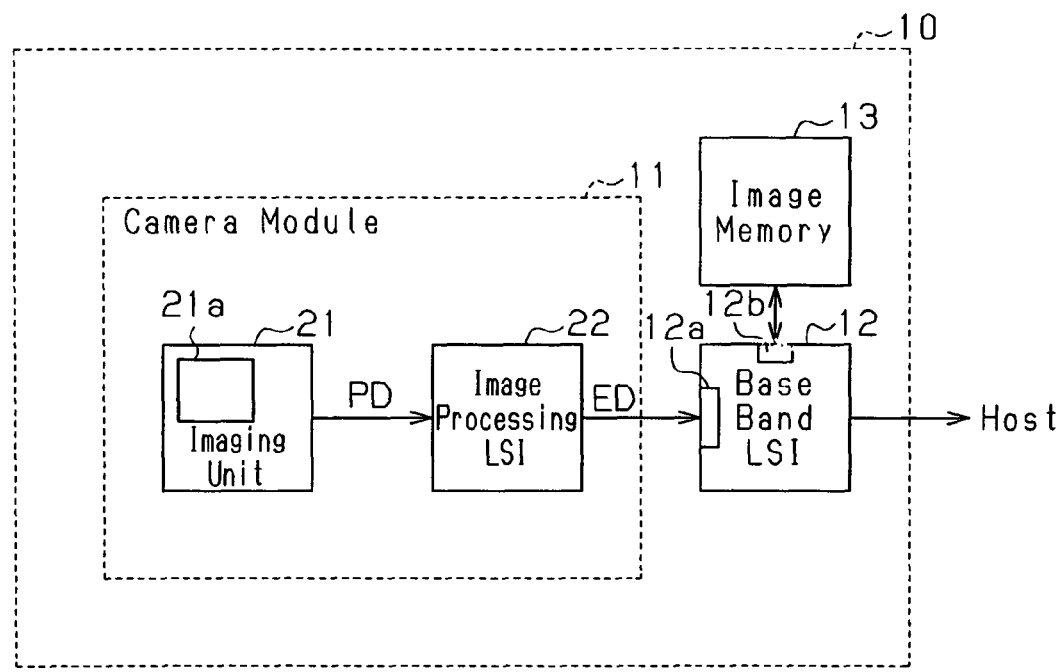
FIG. 1 is a partial block circuit diagram of an image processing system including an image processing LSI according to a preferred embodiment of the present invention.

The image processing system 10 is a digital still camera (DSC) in the preferred embodiment. As shown in FIG. 1, the image processing system 10 includes a camera module 11 functioning as an imaging device, a base band LSI 12 functioning as a signal processor, and an image memory 13.

The camera module 11 includes an imaging unit 21 and an image processing LSI 22 functioning as an image processor. The imaging unit 21 includes an imaging element 21a for generating an output signal corresponding to incident light. The imaging unit 21 A/D converts the output signal of the imaging element 21a to output the image data PD. The image data PD contains color information for the three colors of red (R), green (G), and blue (B) for each pixel.

In addition to the imaging element 21a, the imaging unit 21 includes a color filter and an analog front end circuit. The color filter includes a Bayer array of red (R), green (G), and blue (B) filters. The imaging element 21a, which includes a matrix of a plurality of light receiving cells (pixel), outputs signals charged by each light receiving cell in accordance with the incident light in rows and columns. The analog front end circuit A/D converts the output signal of the imaging element to a digital signal and outputs the converted signal as image data PD (Bayer data). For each pixel, the image data PD includes data for the colors of red (R), green (G), and blue (B). A CCD and a Cis (CMOS image sensor) are examples of the imaging element 21a.

The image processing LSI 22 converts the image data PD of the three primary colors (RGB) to image data S1 (YCbCr data) in a luminance reference format. The image data (YCbCr data) S1 contains luminance information Y and color information Cb and Cr. Each data element Y, Cb, and Cr takes the appropriate value. The image processing LSI 22 may convert the image data PD to image data S1 (YUV data) containing luminance information Y and color information U and V.

The image processing LSI 22 performs two-dimensional compression on the YCbCr data S1 through a predetermined coding method such as the Joint Photographic Experts Group (JPEG) method to generate compressed image data ED. The image processing LSI 22 then outputs the compressed image data ED.

The base band LSI 112 includes a camera interface 12a (YUV-I/F). The volume of data that is to be transferred (horizontal/vertical size) is set in the camera interface 12a. The camera interface 12a receives the set volume of data. The image processing LSI 22 transfers the compressed image data ED to the base band LSI 12 in accordance with the transfer method of the camera interface 12a.

The base band LSI 12 includes a memory interface 12b and stores the compressed image data ED received by the camera interface 12a in the image memory 13 via the memory interface 12b. The base band LSI 12 provides image data read from the image memory 13 to a host (not shown) in response to a signal from the host.

Figure 3:
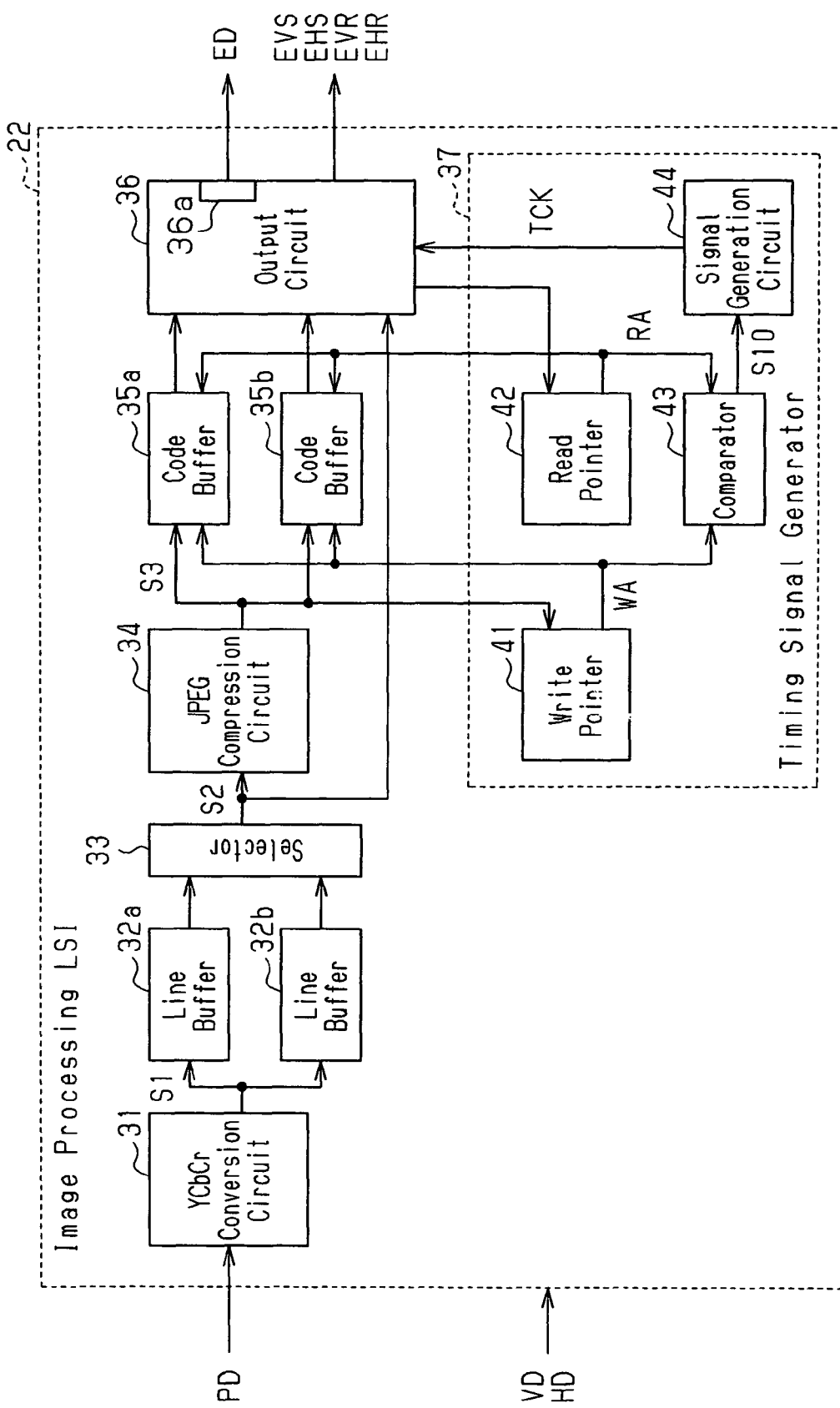
FIG. 3 is a block diagram of the image processing LSI in the preferred embodiment.

As shown in FIG. 3, the image processing LSI 22 includes a YCbCr conversion circuit (format conversion circuit) 31 functioning as an image processing unit, line buffers 32a and 32b, a selector 33, a JPEG compression circuit (two-dimensional compression circuit) 34, code buffers 35a and 35b functioning as a storage unit, an output circuit 36, and a timing signal generator 37. In one embodiment, the image processing LSI 22 is a frame buffer-less LSI which does not include a frame buffer for storing the image data in frame units.

The YCbCr conversion circuit 31 converts the image data PD of the three primary colors (RGB) to the image data S1, which contains the luminance information Y and the color information Cb and Cr. The YCbCr conversion circuit 31 outputs the converted image data S1. The converted image data S1 is alternately stored in the first line buffer 32a and the second line buffer 32b. The first line buffer 32a and the second line buffer 32b respectively have a capacity enabling the storage of image data for a plurality of lines. The capacity is determined in accordance with the configuration of the imaging element 21a. The first and second line buffers 32a and 32b each store the image data of the number of lines (e.g., 8 lines) that is determined in accordance with the processing of the JPEG compression circuit 34. The first and the second line buffers 32a and 32b each have a capacity enabling the storage of image data corresponding to the number of horizontal pixels for eight lines of the imaging element 21a. The image data S1 for a plurality of lines output from the YCbCr conversion circuit 31 are sequentially written to one of the line buffers (e.g., first line buffer 32a) and then written to the other line buffer when the former line buffer becomes full.

The selector 33 sequentially reads a predetermined volume of image data from one of the first and second line buffers 32a and 32b that has become full due to the storage of eight lines of data. Then, the selector 33 provides the read predetermined volume of image data S2 to the JPEG compression circuit 34. The volume of image data read from the line buffers 32a and 32b is set to a block of 8×8 in accordance with the processing by the JPEG compression circuit 34. After reading all of the data from one of the line buffers (e.g., first line buffer 32a), the selector 33 reads the data from the other line buffer that has become full.

That is, when the YCbCr conversion circuit 31 is writing the image data to one of the line buffers, the selector 33 reads the image data stored in the other line buffer. Therefore, the writing of each line of data and the reading of each block of data are alternately performed in each of the first and second line buffers 32a and 32b.

The JPEG compression circuit 34 performs two-dimensional compression through a predetermined method on the image data sequentially input from the format conversion circuit 31 and generates the compressed image data S3. Specifically, the block data of image data is input to the JPEG compression circuit 34. The JPEG compression circuit 34 performs a discrete cosine transformation (DCT) process and a coding process (e.g., Huffman coding) on the block data to output the processed compressed image data S3. The compressed image data S3 is data having a variable length. The compressed image data S3 are alternately stored in the first code buffer 35a and the second code buffer 35b.

The first code buffer 35a and the second code buffer 35b have a predetermined capacity (e.g., four kilobytes). The first code buffer 35a and the second code buffer 35b writes and reads data in response to a write position signal (write address WA) and a read position signal (read address RA) provided from the timing signal generator 37. The first and the second code buffers 35a and 35b sequentially store the compressed image data S3 output from the JPEG compression circuit 34 in accordance with the write address WA. The first and the second code buffers 35a and 35b read and output the image data in accordance with the read address RA.

The output circuit 36 includes a camera interface (YUV interface) 36a. The camera interface 36a outputs the image data read from the first and the second code buffers 35a and 35b to the base band LSI 12 shown in FIG. 1 in synchronization with a transfer clock signal TCK provided from the timing signal generator 37.

The timing signal generator 37 includes a write pointer 41, a read pointer 42, a comparator 43, and a signal generation circuit 44.

The write pointer 41 generates and outputs the write address so that the compressed codes are sequentially stored in the code buffers 35a and 35b in accordance with the quantity of codes in the compressed image data S3 (compressed codes) that is output from the JPEG compression circuit 34. The read pointer 42 generates and outputs the read address RA so that the compressed codes of the code buffers 35a and 35b are sequentially read in accordance with the transfer speed and the transfer timing of the output circuit 36.

The comparator 43 compares the write address WA and the read address RA and provides the comparison result signal S10 to the signal generation circuit 44. For instance, the comparator 43 outputs a comparison result signal S10 with an H level when the difference between the write address WA and the read address RA is greater than or equal to a predetermined number of addresses, and outputs the comparison result signal S10 with the L level when the difference is less than the predetermined number of addresses.

The signal generation circuit 44 generates and provides the transfer clock signal TCK to the output circuit 36. The signal generation circuit 44 changes the frequency of the transfer clock signal TCK in accordance with the comparison result of the comparator 43. In one example, the signal generation circuit 44 includes an oscillator (e.g., PLL circuit), two frequency dividers each generating two signals having a different frequencies in accordance with the output signal of the oscillator, and a selector for selecting one of the output signals from the two output signals of the two frequency dividers in accordance with the comparison result signal S10 of the comparator 43 and outputting the selected output signal as the transfer clock signal TCK. The two output signals of the two frequency dividers each have a first frequency and a second frequency. The first frequency is lower than the second frequency. The second frequency is a frequency that enables the transfer of data having the maximum length, as described in the prior art section. The selector selects the output signal having the first frequency in response to the comparison result signal S10 with the H level and outputs the selected output signal as the transfer clock signal TCK. The selector selects the output signal having the second frequency in response to the comparison result signal S10 with the L level and outputs the selected output signal as the transfer clock signal TCK.

Figure 2:
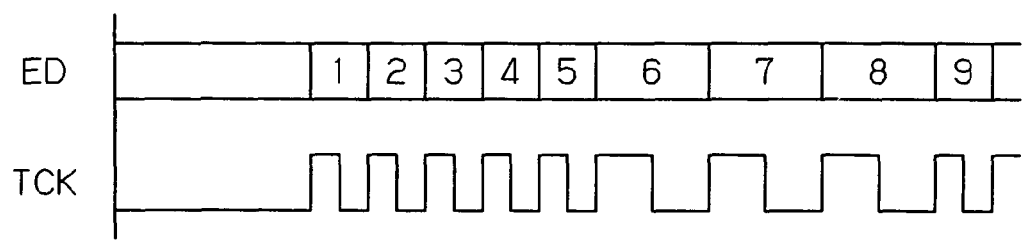
FIG. 2 is a timing chart of a transfer clock signal and an output signal.

More specifically, the timing signal generator 37 changes the frequency of the transfer clock signal TCK in accordance with the difference between the write address WA and the read address RA of the code buffers 35a and 35b or the difference between the write speed and the read speed (refer to FIG. 2). The output circuit 36 outputs the image data ED in synchronization with the transfer clock signal TCK. The transfer speed is relatively low when the output circuit 36 transfers the image data ED in accordance with the transfer clock signal TCK of the first frequency. The transfer speed, on the other hand, is relatively high when the output circuit 36 transfers the image data ED in accordance with the transfer clock signal TCK of the second frequency. FIG. 2 shows that the frequency of the transfer clock signal TCK is dynamically changed. By changing the frequency of the transfer clock signal TCK, the power consumption in the output circuit 36 is reduced, and the switching noise of the output circuit 36 is reduced.

The camera interface 36a in the output circuit 36 sets in advance the volume of data to be transferred as the horizontal size and the vertical size for the receiving side (camera interface 12a) and repeatedly outputs blocks containing data corresponding to the horizontal size and the vertical size. However, the volume of image data (code quantity), corresponding to one frame, output from the JPEG compression circuit 34 is not known when the image data PD is input (or when transfer is started). The output circuit 36 and the base band LSI 12 set the horizontal size to a fixed value (4K, 2K, or 1K) and set the vertical size to the maximum tolerable value of the camera interface 12a. In this setting, data transfer of the next frame cannot be performed until data having the vertical size, which is set to the maximum value, is transferred. The output circuit 36 and the timing signal generator 37 terminates the transfer in accordance with the volume of image data, corresponding to one frame, output from the JPEG compression circuit 34.

More specifically, the output circuit 36 generates a plurality of control signals EVS, EHS, EVR, and EHR, as shown in FIG. 3. The control signal EVS is a vertical synchronization signal that instructs the start of data transfer in the vertical direction, that is, the start of transfer of one frame of image data. The control signal EHS is a horizontal synchronization signal that instructs the start of data transfer in the horizontal direction, that is, the start of transfer of one line (or one block) of image data. The control signal EVR is a vertical validation signal that indicates that the data to be transferred in the vertical direction, or that the one frame of image data, is valid.

The control signal EHR is a horizontal validation signal that indicates that the data to be transferred in the horizontal direction, or the one line (or one block) of image data is valid. The one line (one block) of image data includes the data of fixed value. The base band LSI 12 performs a receiving operation in synchronization with the vertical synchronization signal EVS and the horizontal synchronization signal EHS and receives data during a period in which the vertical validation signal EVR and the horizontal validation signal HER are active.

Figure 4:
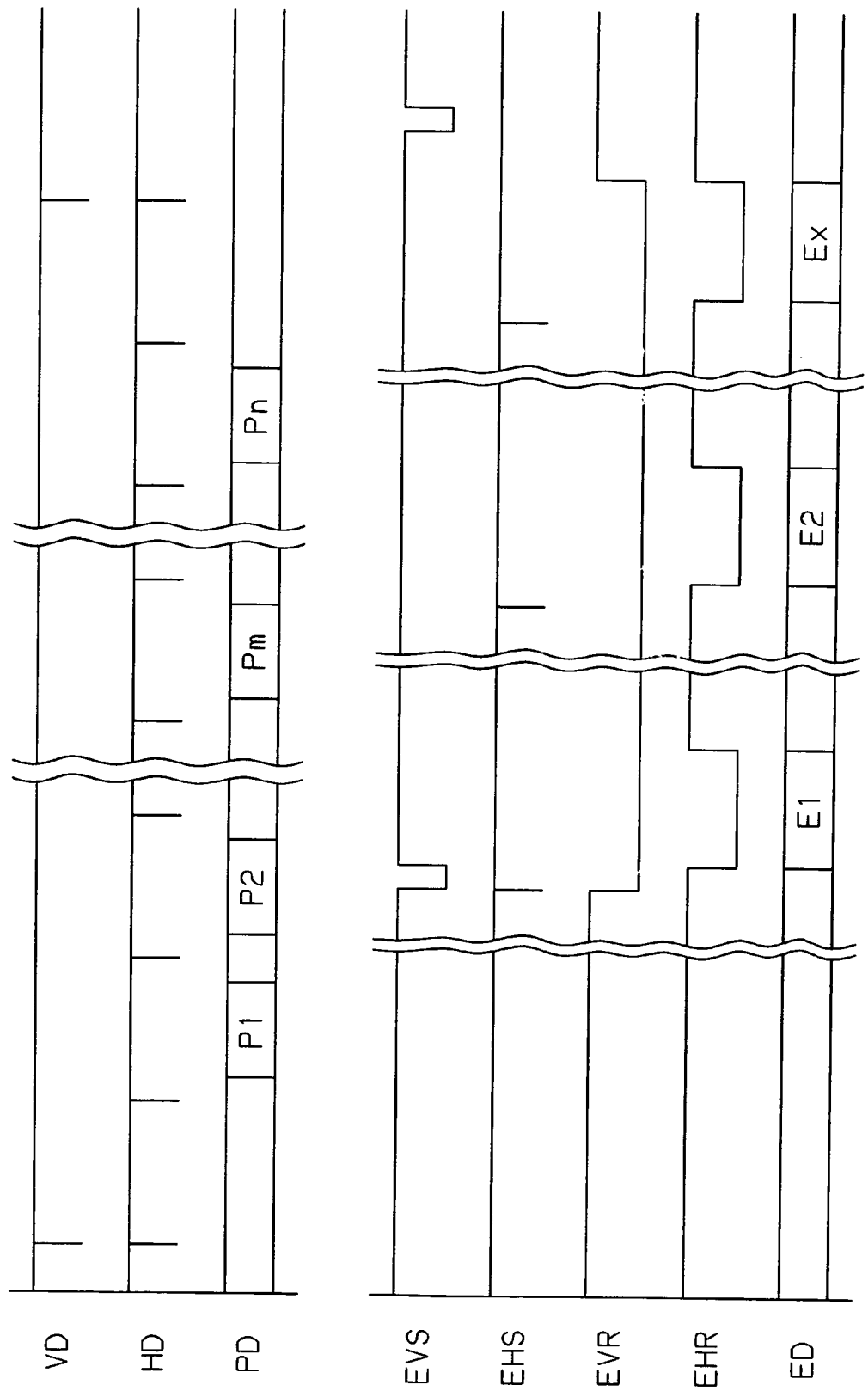
FIG. 4 is a waveform chart of a signal generated by the image processing LSI.

The compressed image data S3 output from the JPEG compression circuit 34 has a variable length. Thus, the volume of compressed image data output finally during the JPEG compression process for one frame may be less than the volume of data for one line. In this case, the output circuit 36 adds the data of a predetermined value (e.g., 1) to the compressed image data that is finally output, generates one line of data, and provides the generated data to the base band LSI 12. The output circuit 36 negates the vertical validation signal EVR and outputs the vertical synchronization signal EVS when the transfer of one frame of compressed image data is completed, as shown in FIG. 4. This completes the data transfer before the transferred line data reaches the vertical size. Therefore, the transfer of compressed image data is completed within a shorter time period than when transferring data having a vertical size set to the maximum value. This enables the next process to be performed. In FIG. 4, the compressed image data ED (E1, E2, . . . , Ex) is line data having a volume of data including the fixed value. The number of lines, or line quantity x, from which the line data is taken is determined in accordance with the compression ratio of the compressed data S3 generated by the JPEG compression circuit 34.

As shown in FIG. 4, the imaging unit 21 provides the image data PD and the synchronization signals VD and HD to the image processing LSI 22. The image processing LSI 22 receives the image data PD (line data P1, P2, ..., Pm, ..., Pn) in accordance with the synchronization signals VD and HD. The volume of data in each piece of line data P1 to Pn corresponds to the number of pixels in the horizontal direction for one frame. The letter n represents the number of lines, or line quantity, from which the line data is taken and is determined in accordance with the number of lines in the vertical direction configuring one frame.

As shown in FIG. 3, the signal output from the selector 33, that is, the signal output from the YCbCr conversion circuit 31 is input to the output circuit 36. This signal contains luminance information Y and color information Cb and Cr. The output circuit 36 has a first mode for outputting the luminance information Y and the color information Cb and Cr, and a second mode for outputting the compressed image data ED. The switching between modes is performed in accordance with a mode switching signal provided from an external circuit (not shown).

The preferred embodiment has the advantages described below.

(1) The JPEG compression circuit 34 performs two-dimensional compression on the output data S1 (S2) of the YCbCr conversion circuit 31 to generate the compressed image data S3. The timing signal generator 37 changes the frequency of the transfer clock signal TCK in accordance with the compressed image data S2. The output circuit 36 outputs the compressed image data ED in accordance with the transfer clock signal TCK. Since the frequency of the transfer clock signal TCK is low when the volume of the compressed image data ED is small, the transfer speed is lowered, and the power consumption is reduced.

(2) The code buffers 35a and 35b sequentially store the compressed image data S3. The output circuit 36 sequentially reads and outputs the compressed image data S3 from the code buffers 35a and 35b. The timing signal generator 37 generates the transfer clock signal TCK having the frequency corresponding to the amount of compressed image data written to the code buffers 35a and 35b and the volume of compressed image data read from the code buffers 35a, 35b. Thus, the frequency of the transfer clock signal may easily be changed in accordance with the volume of the compressed image data.

(3) The interface (camera interface) 36a that outputs data having a fixed length sets the volume of the transferred data in accordance with the transmission destination (base band LSI 12) before starting data transfer. Since the compressed image data has a variable length, the volume of the data is not known before starting data transfer. Thus, the camera interface 36a sets the value of the maximum volume of compressed image data that can be transmitted as the transferring volume for the transmission destination. The output circuit 36 sequentially outputs plural pieces of line data, with each piece having a predetermined volume (fixed length). The line data is generated by dividing the compressed image data of one frame. The output circuit 36 then outputs the synchronization signals EVS and EHS and the validation signals EVR and EHR for receiving the line data. This ensures that the base band LSI 12 receives the data in accordance with the synchronization signal and the validation signal. Further, the output circuit 36 negates the validation signal EVR after sending the final line data containing the final compressed image data. The base band LSI 12 terminates the reception of data in response to the validation signal EVR. The data transfer is completed before the time required to complete the transfer of data having the maximum vertical size would lapse. Thus, useless transfer is not performed. Therefore, the transfer time for one frame of compressed image data is prevented from being prolonged.

(4) The output circuit 36 generates line data of a predetermined volume with the compressed image data and the dummy data DMY when the amount of data of the final line data does not have the predetermined volume. This equalizes the volume of data of the final line data with the predetermined amount and outputs line data with the fixed length.

(5) The YCbCr conversion circuit 31 converts the image data input from the imaging unit 21 to the data separated into the luminance information and the color information. The JPEG compression circuit 34 converts the luminance information and the color information into the compressed image data. Thus, high-speed data transfer is unnecessary, and the output circuit is not required to operate at a high speed. This saves costs and facilitates application to imaging units having a large number of pixels.

It should be apparent to those skilled in the art that the present invention may be embodied in many other specific forms without departing from the spirit or scope of the invention. Particularly, it should be understood that the present invention may be embodied in the following forms.

The output order of the compressed image data may be changed when necessary. For instance, in the output order shown in FIG. 5(A), the compressed image data ED (code Cd[0], Cd[1], Cd[2], ..., Cd[7]) is continuously output in synchronization with the transfer clock signal TCK. FIG. 5(B) shows a JPEG code image. The data length of each code Cd[0] ... is eight bits. Alternatively, in the output order shown in FIG. 6(A), the compressed image data ED (code Cd[0], Cd[1], ...) and the dummy data DMY may be alternately output in synchronization with the transfer clock signal TCK, FIG. 6(B) shows a JPEG code image.

In the image data (YCbCr data) containing the luminance information and the color information transferred in the camera interface 36a, information regarding matter not noticeable to the human eye may be eliminated to reduce the entire data volume. For YCbCr data, the "Y" image data is used, and the color information is eliminated with the "Cb" and "Cr" image data in the main operating direction. Such an elimination technique is referred to as "4:2:2". That is, the volumes of the "Cb" and "Cr" image data are respectively reduced by half with respect to the data volume of the "Y" image data. Since the volume of the "Y" image data differs from the volume of the "Cb" and "Cr" image data, the "Cb" image data and the "Cr" image data are alternately output between the "Y" image data in the camera interface 36a. Thus, the transfer of each piece of image data for one frame ends at substantially the same time.

In the base band LSI receiving the image data (YCbCr data), each piece of image data ("Y" image data, "Cb" image data, "Cr" image data) is sequentially stored in a different region. Thus, when outputting the compressed image data in the order shown in FIG. 5(A), data is not stored in the arrangement shown in FIG. 5(B) since the received compressed image data is stored in different regions in the base band LSI, which is set to receive the image data containing luminance information and color information. Therefore, the setting of the storage region must be changed when receiving the compressed image data and when receiving the image data containing the luminance information and the color information.

In the output order in which the compressed image data and the dummy data DMY are alternately output, the base band LSI set to receive the image data containing the luminance information and the color information stores the received compressed image data in the arrangement shown in FIG. 6(B) and sequentially stores the data in the same region. Therefore, the setting of the region for storing does not need to be changed when receiving the compressed image data and when receiving the image data containing the luminance information and the color information. The base band LSI is able to receive the compressed image data without changing (adding) the setting of the conventional base band LSI for receiving the image data containing the luminance information and the color information.

The image processing LSI may have a mode for outputting the data in the order shown in FIG. 5(A) and a mode for outputting the data in the order shown in FIG. 6(A), and the modes may be switched in accordance with the setting information. In such a configuration, the image processing LSI corresponds to the base band LSI, for receiving the image data containing the luminance information and the color information, and the base band LSI, for continuously receiving the compressed image data.

Figure 7:
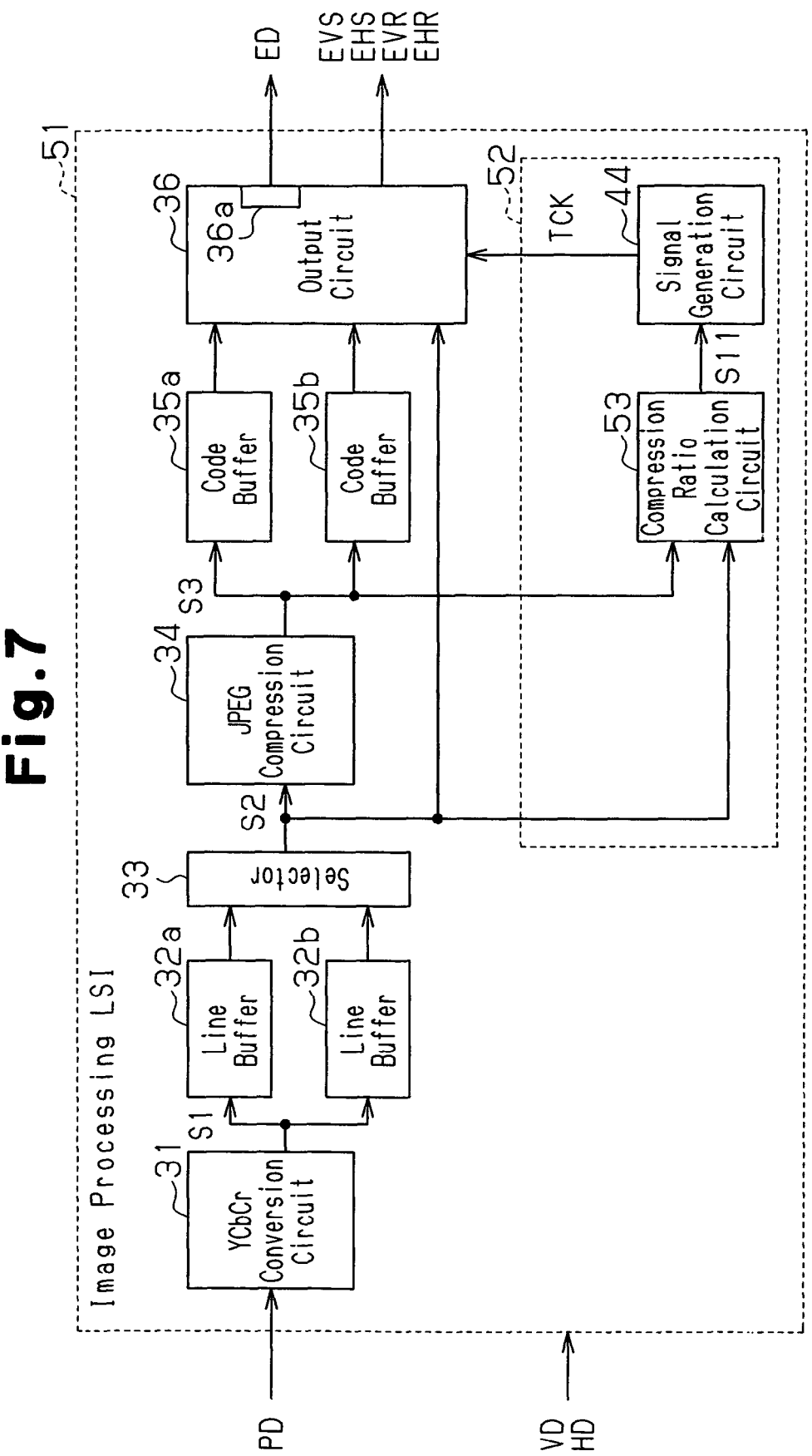
FIG. 7 is a block diagram showing a modification of the image processing LSI.

The frequency of the transfer clock signal TCK may be changed in accordance with the code quantity of the compressed image data S3 (compressed code) output from the JPEG compression circuit 34. For instance, the image processing LSI 51 may include a timing signal generator 52, as shown in FIG. 7. The timing signal generator 52 includes a compression ratio calculation circuit 53 for calculating the average compression ratio in accordance with the code quantity of the image data S2 input to the JPEG compression circuit 34 and the code quantity of the image data S3 output from the JPEG compression circuit 34. The signal generation circuit 44 changes the frequency of the transfer clock signal TCK in accordance with the calculated average compression ratio S11. Further, the frequency of the transfer clock signal TCK may be changed in accordance with the average value of the code quantity of the image data output from the JPEG compression circuit 34 (code quantity of the compressed image data generated by the data of 8×8 pixel block) and the code quantity of the image data output in correspondence with a plurality of blocks.

The frequency of the transfer clock signal TCK may be changed to three or more different frequencies. The comparator 43 may, for example, compare the write address WA and the read address RA and output a signal including a plurality of bits in accordance with the comparison result. As the frequency of the transfer clock signal TCK changes in fine steps in accordance with the code quantity of the compressed image data output from the JPEG compression circuit 34, power consumption and noise are efficiently reduced.

The present examples and embodiments are to be considered as illustrative and not restrictive, and the invention is not to be limited to the details given herein, but may be modified within the scope and equivalence of the appended claims.

What is claimed is:

1. An image processor for use with an image memory, the image processor comprising:
    an image processing unit configured to perform predetermined image processing on image data and outputting processed image data;
    a two-dimensional compression circuit configured to perform a two-dimensional compression process on the processed image data to generate compressed image data;
    a timing signal generator configured to calculate a compression ratio of the volume of the processed image data input to the two-dimensional compression circuit and the volume of the compressed image data output from the two-dimensional compression circuit and to change frequency of a transfer clock signal in accordance with the compression ratio of the compressed image data; and
    an output circuit coupled to the timing signal generator and operating to output the compressed image data to the image memory in accordance with the transfer clock signal provided from the timing signal generator.

2. The image processor according to claim 1, further comprising:
    a buffer configured to sequentially store the compressed image data, wherein the output circuit sequentially reads and outputs the compressed image data stored in the buffer, and the timing signal generator changes the frequency of the transfer clock signal in accordance with volume of the compressed image data written to the buffer and volume of the compressed image data read from the buffer.

3. The image processor according to claim 1, wherein the output circuit includes an interface configured to output data having a fixed length, and wherein the output circuit:
    sequentially outputs, via the interface, plural pieces of line data generated by dividing the compressed image data, with each piece of line data having a predetermined volume;
    outputs a synchronization signal and a validation signal for receiving the line data; and
    negates the validation signal after outputting a final piece of the line data containing final compressed image data.

4. The image processor according to claim 3, wherein the output circuit generates the line data having the predetermined volume with the compressed image data and dummy data when the volume of the final piece of line data is less than the predetermined volume.

5. The image processor according to claim 1, wherein the image processing unit includes a conversion circuit configured to convert the image data to data containing luminance information and color information.

6. The image processor according to claim 1, wherein:
    the output circuit has an interface configured to output data including luminance information and color information; and
    the interface alternately outputs line data containing luminance information and line data containing color information, outputs line data containing the compressed image data in lieu of the line data containing the luminance information, and outputs line data containing dummy data in lieu of the line data containing the color information.

7. The image processor according to claim 1, wherein the image processor is a frame buffer-less LSI.

8. An image processor for use with an image memory, the image processor comprising:
    an image processing unit configured to perform predetermined image processing on image data and outputting processed image data;
    a two-dimensional compression circuit configured to perform a two-dimensional compression process on the processed image data to generate compressed image data;
    a timing signal generator generating a transfer clock signal;
    an output circuit coupled to the timing signal generator and operating to output the compressed image data to the image memory in accordance with the transfer clock signal provided from the timing signal generator; and a buffer coupled to the two-dimensional compression circuit to sequentially store the compressed image data, wherein the output circuit sequentially reads and outputs the compressed image data stored in the buffer, and the timing signal generator changes the frequency of the transfer clock signal in accordance with a write address of the buffer at which the compressed image data is written and a read address of the buffer from which the compressed image data is read and provides the output circuit with the transfer clock signal having the frequency corresponding to the amount of compressed image data written to the buffer and the volume of compressed image data read from the buffer.

9. The image processor according to claim 8, wherein the timing signal generator changes the frequency of the transfer clock signal in accordance with the difference between the write address and the read address.

10. The image processor according to claim 8, wherein the timing signal generator increases the frequency of the transfer clock signal when the difference between the write address and the read address is large and reduces the frequency of the transfer clock signal when the difference between the write address and the read address is small.

11. An imaging device for use with an image memory, the imaging device comprising:

an imaging unit configured to output image data in accordance with incident light; and an image processor, coupled to the imaging unit, and configured to perform predetermined image processing on the image data, the image processor including:

an image processing unit configured to perform predetermined image processing on the image data to output processed image data;

a two-dimensional compression circuit configured to perform a two-dimensional compression process on the processed image data to generate compressed image data;

a timing signal generator, coupled to the two-dimensional compression circuit, and configured to calculate a compression ratio of the volume of the processed image data input to the two-dimensional compression circuit and the volume of the compressed image data output from the two-dimensional compression circuit and to change frequency of a transfer clock signal in accordance with the compression ratio of the compressed image data; and an output circuit, coupled to the timing signal generator, and operating to output the compressed image data to the image memory in accordance with the transfer clock signal provided from the timing signal generator.

12. An image processing system comprising:

an imaging unit configured to output image data in accordance with incident light;

an image processor, coupled to the imaging unit, and configured to perform predetermined image processing on the image data;

an image memory; and a signal processor, coupled to the image processor and the image memory, and configured to store the image data output from the image processor in the image memory, the image processor including:

an image processing unit configured to perform predetermined image processing on the image data to output processed image data;

a two-dimensional compression circuit configured to perform a two-dimensional compression process on the processed image data to generate compressed image data;

a timing signal generator, coupled to the two-dimensional compression circuit, and configured to calculate a compression ratio of the volume of the processed image data input to the two-dimensional compression circuit and the volume of the compressed image data output from the two-dimensional compression circuit and to change frequency of a transfer clock signal in accordance with the compression ratio of the compressed image data; and an output circuit, coupled to the timing signal generator and the image memory, and operating to output the compressed image data to the image memory in accordance with the transfer clock signal provided from the timing signal generator.

* * * * *